June 14, 1960     A. J. TAYLOR     2,940,769
ELEVATING DOLLY

Original Filed Nov. 4, 1955     4 Sheets-Sheet 1

INVENTOR:
ALLAN J. TAYLOR

By Willard M. Graham
AGENT

June 14, 1960 A. J. TAYLOR 2,940,769
ELEVATING DOLLY
Original Filed Nov. 4, 1955 4 Sheets-Sheet 2

INVENTOR:
ALLAN J. TAYLOR
By Willard M. Graham
AGENT

June 14, 1960  A. J. TAYLOR  2,940,769
ELEVATING DOLLY
Original Filed Nov. 4, 1955  4 Sheets-Sheet 3

INVENTOR:
ALLEN J. TAYLOR

By Willard M. Graham
AGENT

June 14, 1960

A. J. TAYLOR 2,940,769

ELEVATING DOLLY

Original Filed Nov. 4, 1955

INVENTOR:
ALLEN J. TAYLOR

AGENT

United States Patent Office 2,940,769
Patented June 14, 1960

2,940,769
ELEVATING DOLLY

Allan J. Taylor, Pacific Palisades, Calif., assignor to Northrop Corporation, a corporation of California Original application Nov. 4, 1955, Ser. No. 544,850, now Patent No. 2,896,909, filed July 28, 1959. Divided and this application Apr. 21, 1959, Ser. No. 807,958

4 Claims. (Cl. 280—43.23)

This application is a division of our copending application Serial No. 544,850, filed November 4, 1955, now Patent 2,896,909, which is directed to material handling equipment.

This invention relates to material handling equipment and more particularly to elevating type dollies especially useful in the handling and positioning of heavy equipment.

Frequently it is necessary to impart various movements, including lateral and longitudinal movements, to equipment mounted on and positioned by means of an elevating dolly. This is particularly true in the aircraft industry where elevating dollies are extensively utilized to position equipment and components in and on aircraft structures. Although means are incorporated in most elevating dollies for imparting roll, pitch and yaw movements to components mounted thereon, no provision, to the best of applicant's knowledge, has as yet been incorporated in elevating dollies enabling lateral movements to be imparted to components mounted thereon without extensive repositioning and manipulation of the dolly. Also the situation frequently arises requiring the elimination of relative movement between a supporting surface and structure on which components or equipment are to be mounted. A situation of this type frequently occurs when a dolly equipped with pneumatic tires is utilized in carrying out positioning operations on moving vehicles such as ships.

Another object is to provide an elevating type dolly the base portion of which may be lowered to contact a supporting surface and thereby provide a firm, stable foundation for the dolly.

Another object is to provide an elevating type dolly incorporating means whereby the dolly may be steadied to provide a firm, stable foundation therefor other than the stability provided by the base portion.

Another object is to provide an elevating type dolly which is simple in design yet rugged in construction, economical to manufacture, and which may be easily adapted to any purpose for which it is intended.

Although the characteristic features of the present invention are particularly pointed out in the appended claims, the invention itself, also the manner in which it may be carried out, will be better understood by referring to the following description taken in connection with the accompanying drawings forming a part of this application and in which:

Figure 1:
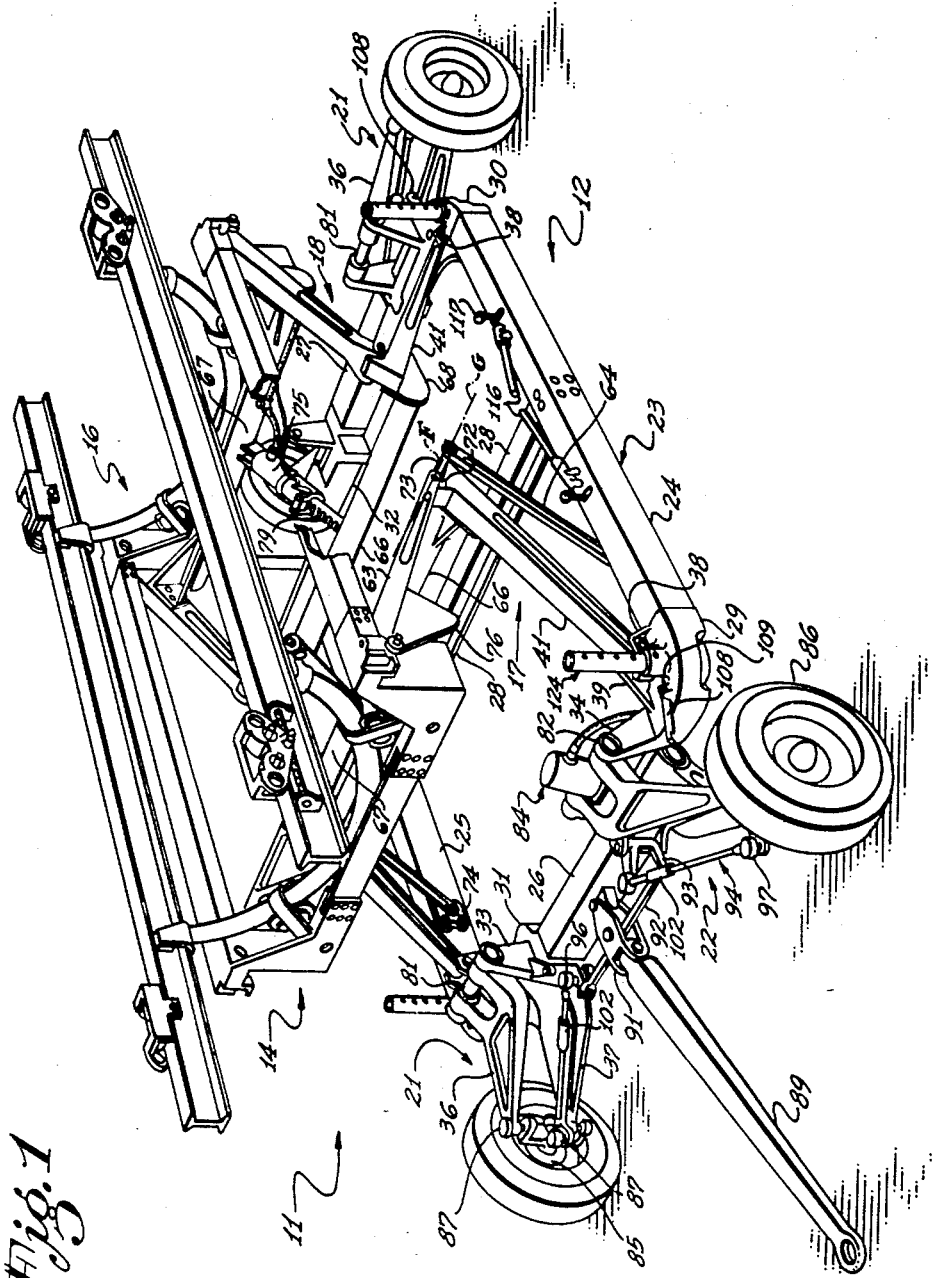
Figure 1 is a perspective view of the elevating dolly disclosed herein.

Referring to the drawings and particularly Figure 1 an elevating dolly 11 of the type disclosed herein is shown. The dolly 11 includes a base assembly 12, an elevating assembly 14, a crade assembly 16, fore and aft scissor type linkage assemblies 17 and 18, respectively, hydraulic equipment 19 (not identified in Figure 1), and wheel and linkage assemblies 21 and 22.

Figures 2, 3:
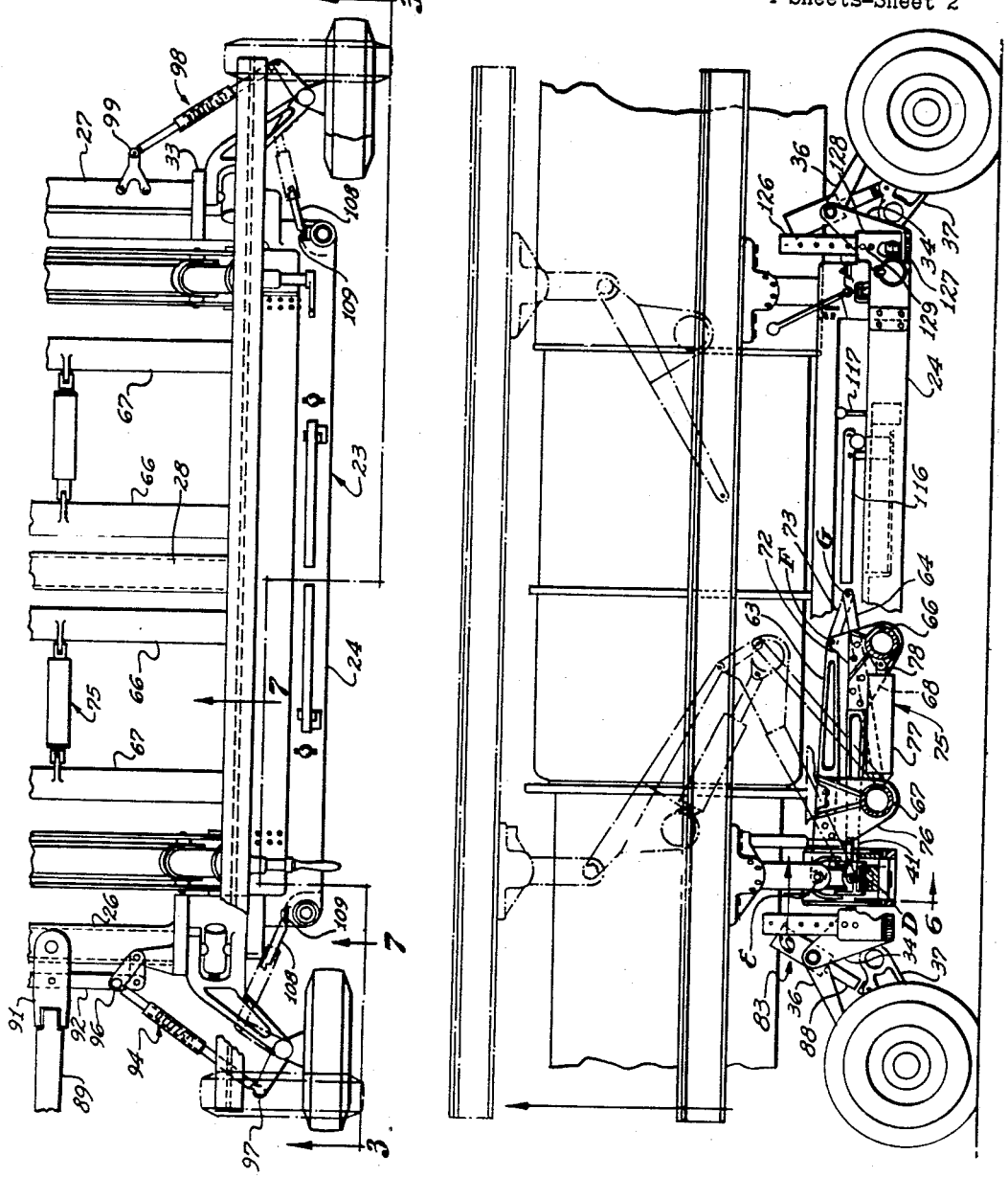
Figure 2 is a partial plan view of the dolly shown in Figure 1.
Figures 3 and 4 are side and end elevational views, respectively, of the dolly shown in Figure 1 with portions thereof broken away in each instance.
Figure 4:
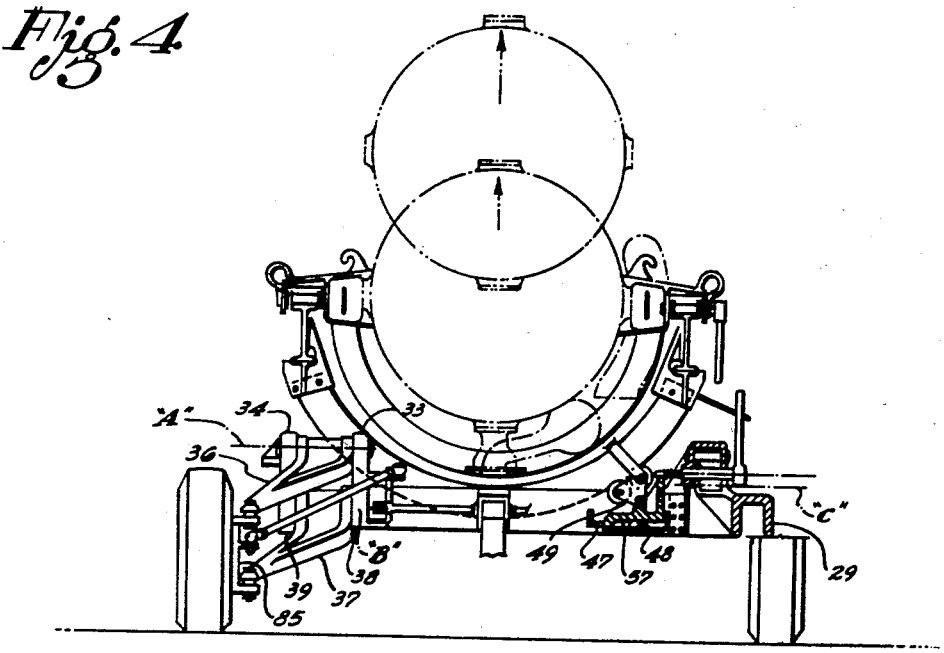

The assembly 12 consists of a plurality of elongated channel members 24–28, inclusive, joined together by corner castings 29–32, inclusive, to provide a substantially coplanar lower frame member 23 of substantially rectangular configuration as viewed in Figure 2. The channel member 28 extends between the side members 24 and 25 intermediate their end portions to provide rigidity to the frame member 23. Spaced upstanding lug portions 33 and 34 extend from each of the castings 29–32, inclusive, to provide pivotal supports for the inner ends of upper and lower supporting links 36 and 37, respectively, of the wheel linkage assemblies 21 and 22. Additional spaced upstanding portions 38 and 39 extend from each of the corner castings to provide pivotal supports for the lower links 41 of the assemblies 17 and 18.

The base assembly 12 and elevating assembly 14 are joined together for relative vertical movement by the aforementioned fore and aft linkage assemblies 17 and 18, respectively. Each of these linkage assemblies consists of the previously referred to lower links 41 and upper links 63, respectively. In addition the upper links of the assemblies 17 each have an extension 73 fixedly secured thereto, as by welding or the like, and having a slight angular relationship with respect to the link 63 substantially as shown in Figure 1. Also the assemblies 17 include an auxilary link 64. The assemblies 17 and 18 will hereinafter be referred to as the main and auxiliary linkage assemblies, respectively.

Except for the extensions 73 and auxiliary links 64 the construction of the assemblies 17 and 18, and the method of attaching these assemblies to the assemblies 14 and 23, are the same, therefore, a description of the assemblies 17 will be applicable to the assemblies 18 except as noted above.

Referring then to the main linkage assemblies, one end of each of the links 41 is attached to the spaced portions 38 and 39, extending from the respective corner castings 29 and 31, for pivotal movement about an axis D (Figure 3). Depending from the other end of each of the links 41 is a plate-like element 68 between which a cross-member 66 extends in fixed relationship. One end of each of the links 63 is secured to end portions of the assembly 14 for pivoted movement about an axis E as best seen in Figure 3. The other ends of the links 63 are mounted for pivoted movement about an axis F located in upstanding portions 72 formed at the ends of the links 41 which are spaced from the castings 29 and 31. A tubular cross-member 67 also extends between and is fixedly secured to plate-like elements 76 which depend from the ends of the links 63 which are attached to the assembly 14. Pivotally attached to and extending between the cross-members 66 and 67 at the midportions thereof is a hydraulic actuator 75. The actuator includes a cylinder 77 and piston rod 78 and is equipped with a conventional safety device 79 functioning to prevent actuator collapse in the event of fluid failure.

The wheel and linkage assemblies 21 are located at diagonally opposite corners of the frame 23 and the assemblies 22 are located at the other diagonally opposite corners. The upper links 36 of the assemblies 21 are pivotally attached to the spaced portions 33 and 34 by means of continuous pins 81 extending therethrough. The upper links 36 of the assemblies 22 are likewise pivotally attached to the portions 33 and 34 by noncontinuous pins 82 the inner ends of which are secured to the cylinders of hydraulic actuators 84 as by welding or the like. The lower links 37 of the assemblies 21 and 22 are fixedly secured to torque tubes 83 (Figure 7) which are also pivotally mounted in the spaced portions 33 and 34 of the corner castings. The tubes 83 transmit angular movement between the two links 37 located respectively at the fore and aft ends of the frame 23. The outer ends of the links 36 and 37 are provided with ball type sockets 87 by means of which axles 85 of the wheels 86 are mounted for pivotal movement about vertical axes. The piston rods 88 of the actuators 84 are pivotally attached to the lower links 37. Angular movement is imparted to the links 36 and 37 by means of the actuators 84 as presently explained.

The dolly 11 is steered by means of a tow bar 89. The tow bar is attached to a clevis 91 for pivotal movement about a horizontal axis while the clevis is attached to the member 26 for pivotal movement about a vertical axis. Extending between the leg portions of the clevis 91 and pivotally attached thereto is a tie rod 92. The end portions of the rod 92 are pivotally attached to respective arms of U-shaped members 93 which are mounted on the castings 29 and 31, respectively, for pivotal movement about a vertical axis. A radius rod 94 extends between an arm projecting from each of the members 93 and an arm projecting from the axle of each of the front wheels 86. Each of the radius rods 94 are attached to members 93 and the axles 85 of the front wheels by means of ball joints 96 and 97, respectively. The aft assemblies 21 and 22 are also provided with positioning rods 98 similar to the radius rods 94. The rods 98, however, are not used during normal steering operations and are normally attached to the member 27 by initial pivotal means constituting ball and socket type joints 99.

Figure 6:
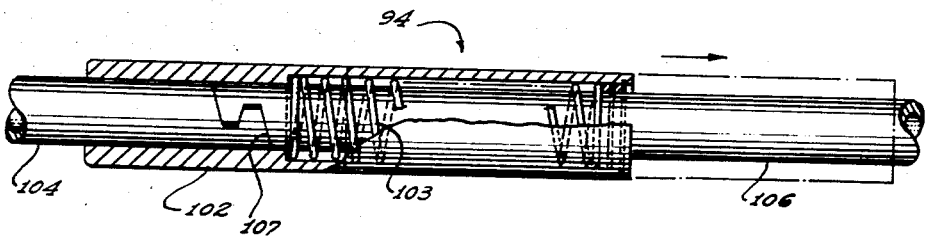
Figure 6 is a detail view of a typical radius rod utilized with the dolly of Figure 1.

Each of the rods 94 and 98 are provided with quick disconnect means at a location intermediate their ends. A typical quick disconnect is shown in Figure 6 in which one of the rods 94 is used for illustrative purposes. The disconnect consists of a sleeve 102 normally urged to the position shown by solid construction by a spring 103. The rod 94 consists of two portions 104 and 106 joined by mating saw-tooth structure formed therein as indicated at 107. With the sleeve 102 moved to the position indicated by phantom construction it will be apparent that the rods 104 and 106 may be readily separated. Stub rods 108 having saw-tooth means formed at their free ends are pivotally attached at their opposite ends to the castings 29–32 by alternate pivotal means 109.

Upon separation of the rods 94 and 98 it will be apparent that the wheels 86 may be pivoted through an angle of ninety degrees (90°) to a position in which the central vertical planes of the wheels are normal to the longitudinal axis of the dolly 11, substantially as shown by phantom construction in Figure 2. The rod portions, attached to the wheels 86, may then be secured to the stub rods 108 to maintain the wheels in the last mentioned positions. It will be apparent that this construction permits the dolly 11 to be moved in a direction normal to the longitudinal axis thereof and that such a maneuver will be extremely useful in instances where it is not possible to move the dolly in a longitudinal direction into a desired position.

Figure 5:
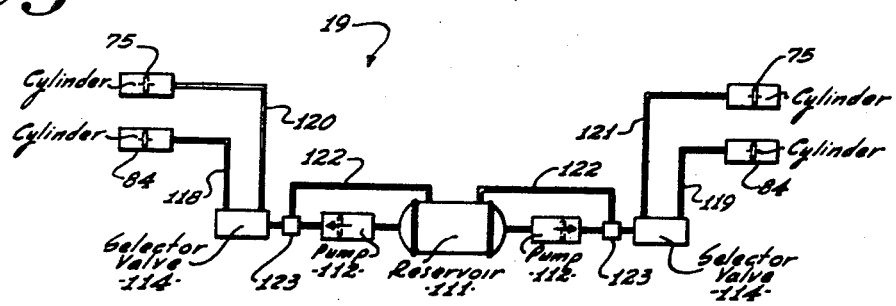
Figure 5 is a diagrammatic showing of the hydraulic system employed in the dolly of Figure 1.

The aforementioned hydraulic system 19 includes a fluid reservoir 111, pumps 112, selector valves 114, and the actuators 75 and 84 as schematically shown in Figure 5. The reservoir, pumps, and selector valves 111, 112, and 114, respectively, are mounted within the member 24. Handles 116, for actuating the pumps 112, and control levers 117, for regulating the flow of fluid through the valves 114, are located in a readily accessible position adjacent the upper surface of the member 24. Flexible tubing 118–121, inclusive, provide fluid communication between the valves 114 and actuators 75 and 84. Lines 122 and bypass valves 123, the latter being positioned in the lines extending between the pump 112 and valves 114, allow fluid to by-pass the actuators 75 and 84 in the event excessive fluid pressure develops within the hydraulic system.

By utilizing portions of the hydraulic system 19 the assembly 12 may be moved between an elevated position and a lowered or bottomed position. In the elevated position the frame 23 is located a predetermined distance above the surface on which the wheels 86 are resting. In the lowered or bottomed position the frame 23 rests on on the aforementioned surface. Thus in the lowered position the frame 23 provides a firm stable foundation for the dolly 11. Resilient movements due to pneumatic tires which may be mounted on the wheels 86 are effectively eliminated. Also relative swaying movements, occurring at such times as the dolly 11 may be utilized on board ship to positive armaments or the like, is also effectively eliminated.

Assuming the assembly 12 is in its raised position and it is desired to move it to its lowered position levers 117 are positioned so that a restricted amount of fluid flows from the actuators 84 to the reservoir 111. The force of gravity acts to lower the dolly until the frame 23 is in contact with the surface on which the wheels 86 are resting. The assembly 12 may subsequently be returned to its raised position upon adjustment of the valves 114 and actuation of the pumps 112. In this connection it should be understood that angular movements imparted by the actuators 84 to the links 37, associated with the assemblies 22, are transmitted to the links 37, associated with the assemblies 21, through the torque tubes 83.

The relationship of the members 36, 37 and 94, with respect to the frame member 23 and the wheels 86, is such that these members do not impart movement such as caster, camber, etc. to the wheels 86 during the raising or lowering of the frame member 23. Also the relationship of the above members is such that the possibility of binding of the members 36, 37 and 94 is precluded as the base member 23 is raised and lowered.

Figure 7:
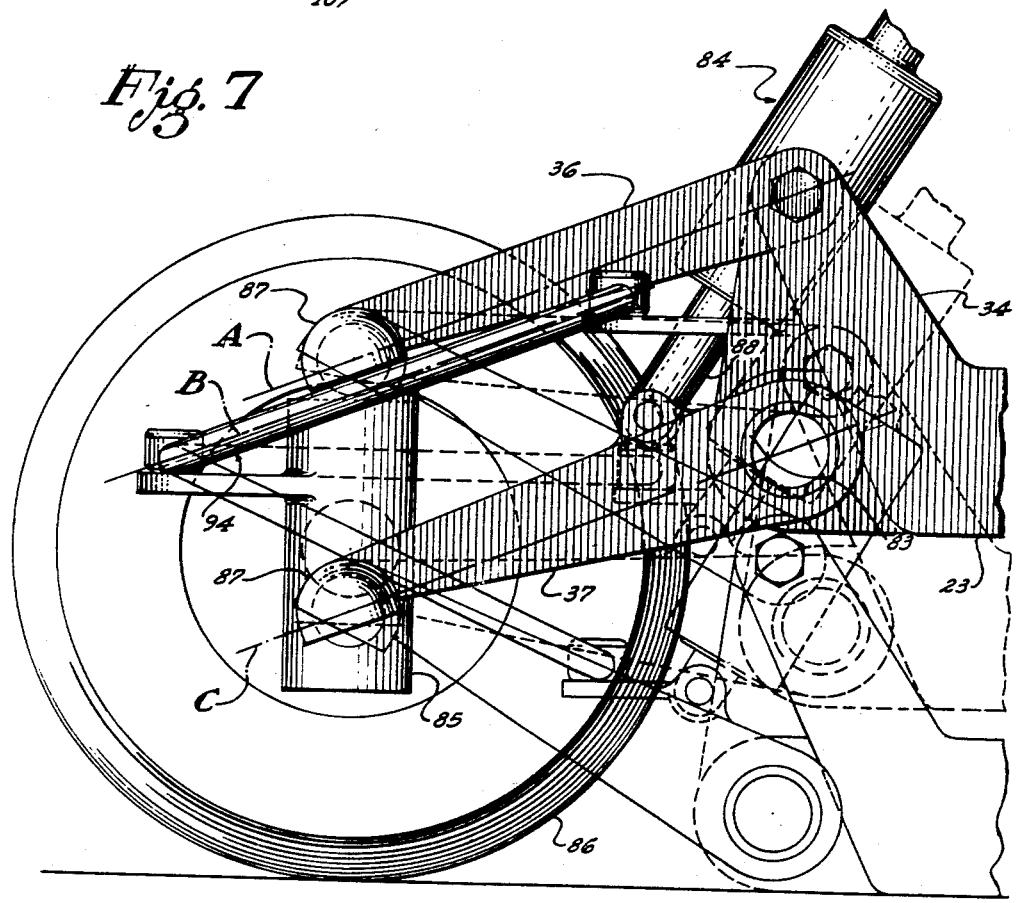
Figure 7 is a detail view of a front wheel suspension of the dolly of Figure 1.

The relationship of the members 36, 37, and 94, as referred to above, will be apparent by referring to Figure 7. In this figure the members 36, 37, 94, and associated members are shown in a projected relationship on a vertical plane containing the longitudinal axis of the frame member 23. The lines A, B, and C represent center lines extending between the respective pivotal points of the links 36, 37, and the rod 94. It will be noted that the projected lengths of the lines A, B, and C are equal and bear a parallel relationship with respect to each other. Further this relationship remains as shown during relative movement of the member 23 with respect to the wheels 86 as the member 23 is raised or lowered. For any position of the frame member 23 the horizontal distances between the respective pivotal points of the rod 94 and links 36 and 37 on the member 23 and the respective pivotal points of the rod 94 and links 36 and 37 on the axle 85 are equal. Accordingly the lines A, B, and C, considered with vertical lines extending through respective pivotal points, constitute a parallelogram type movement which does not impart undesirable movements to the wheels 86 and precludes the possibility of binding between the wheel linkages and the rods 94 and 98.

In addition to the steadying means described above, i.e., lowering the frame 23 into contacting relationship with a supporting surface, a steady rest unit 124 is mounted in a vertical attitude in each of the corner castings 29–32, inclusive. Each of the units 124 consists of a cylindrical stem 126 and foot or pad portion 127 as best seen in Figure 3. The stem 126 passes through an aperture formed in the corner castings and extends through an upstanding collar 128 formed on the corner castings. Mating apertures are provided in the stems 126 and collars 128 to receive a pin 129 whereby the unit 124 may be secured in a plurality of vertical positions.

In the uppermost position of the unit 124 the pads 127 are recessed in the lower portion of the corner castings. It will be apparent that the units 124 may be lowered a predetermined distance below the assembly 12 and secured in this position by the pins 129. Accordingly upon lowering the assembly 12 the dolly 11 will come to rest on the units 124 rather than the base members 23. The steady rest units 124 will be especially useful at such times as the dolly 11 is used on movable surfaces, e.g. the deck of ships and the like.

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claims.

What is claimed is:

1. In an elevating type dolly, the combination comprising: a rectangular base structure; a plurality of wheel assemblies each including a wheel, linkage assemblies including upper and lower links and an axle; said upper and lower links being pivotally attached to said axles and the respective corners of said base structure; and power means extending between said base structure and linkage assemblies functioning when actuated to move said base structure between elevated and lowered positions in which said base structure is positioned a predetermined distance above a horizontal surface on which the wheels of said wheel assemblies are resting, and in which said base structure is resting on said horizontal surface, respectively.

2. Apparatus as set forth in claim 1: further characterized in that said linkage assemblies are attached to said axles by ball and socket type pivotal connections permitting movement of said wheels about a vertical axis through an angle of at least ninety degrees.

3. Apparatus as set forth in claim 1: further characterized in that the relationship of said linkage assemblies with respect to said base structure is such that a continuous line, extending between and being normal to the pivotal axes of said upper and lower links with respect to said base structure and the points about which said upper and lower links pivot on said axle, defines a parallelogram the ends of which are always vertical regardless of the position of said wheel assemblies with respect to said base structure.

4. In an elevating dolly, the combination comprising: a rectangular base structure; a wheel assembly including a wheel mounted at each corner of said base structure normally supporting the latter in an elevated position at a predetermined distance above a horizontal surface on which the wheels of said wheel assemblies are resting; power means associated with said wheel assemblies functioning when actuated to move said base structure between said elevated position and a lowered position in which said base structure is in contacting relation with said horizontal surface; steering means for the wheel assemblies located at one end of said base structure embracing a pair of separable rods pivotally attached to and extending between initial means mounted on said base structure and respective wheel assemblies located at said one end of said base structure; a pair of separable positioning rods pivotally attached to and extending between the wheel assemblies located at the other end of said base structure and initial means on said base structure functioning to normally maintain the wheels of the last named wheel assemblies in planes parallel to a vertical plane extending longitudinally of said base structure; and means pivotally attached to said base structure to which the portions of said positioning rods secured to said wheel assemblies may be attached to position and maintain all wheels of said wheel assemblies in vertical planes normal to said vertical plane extending longitudinally of said base structure.

References Cited in the file of this patent
UNITED STATES PATENTS

| | | |
|---|---|---|
| 2,226,970 | Engel | Dec. 31, 1940 |
| 2,313,877 | Joyce | Mar. 16, 1943 |
| 2,471,901 | Ross | May 31, 1949 |